Nov. 3, 1964 R. B. CHAMBERS 3,155,181
CONVEYOR SCALE AND RECORDER
Filed March 26, 1962 2 Sheets-Sheet 1

INVENTOR.
Robert B. Chambers
BY
ATTORNEYS

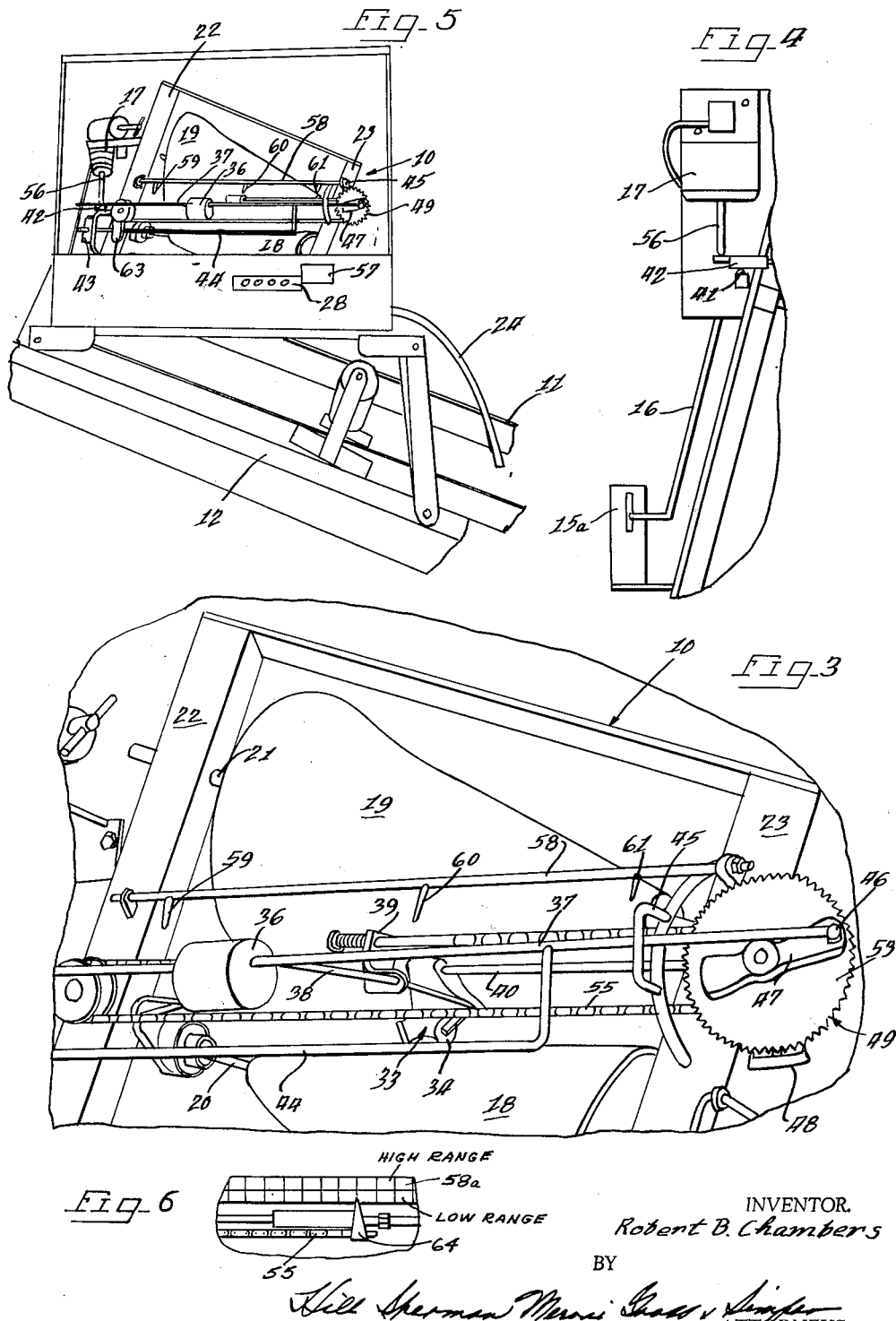

United States Patent Office 3,155,181
Patented Nov. 3, 1964

3,155,181
CONVEYOR SCALE AND RECORDER
Robert B. Chambers, Lander, Wyo., assignor to Belt-Scales Corporation, Salt Lake City, Utah, a corporation of Nevada
Filed Mar. 26, 1962, Ser. No. 182,320
9 Claims. (Cl. 177—16)

This invention relates to a weighing device for use with a belt conveyor, and more particularly to a scale and recording device for loads on a belt conveyor and which is operable by the conveyor.

Previous scales and recording means for belt conveyor weighing of which I am aware have required an external energy and have generally been limited in the range of weights to which they are responsive. Other devices are limited because of their complexity and liability to breakdown, or the technical understanding required, as with electronic recording devices requiring trained technicians for adjustment and maintenance. Previous devices have also been susceptible to vibration and/or have been so bulky as to be impractical for use on portable equipment.

In contrast the weighing mechanism of the present invention may be housed in a portable steel cabinet of very compact dimensions, and may be used to record the weight in any given state of operation as well as to give total weights and the exact weight of materials moved for any running time.

In accordance with the invention, the framework of the scale may be mounted on the channels or struts that support the conveyor belt idlers. A pair of idlers for the belt are mounted on a sub-frame which in turn is supported by a diaphragm component of a hydraulic pressure chamber. The weight of the idlers, belt and material carried on the belt is transmitted by hydraulic pressure through a connecting tube to the recording mechanism in the cabinet mounted on the scale frame, in other suitable location.

Further in accordance with the invention, a pair of modified cones is used to drive the recording mechanism, one of the cones being drawn by a flexible shaft and drum in contact with the conveyor belt, and the other cone being connected to a counter which records the weight of material as it is passed along the belt. In a preferred embodiment the belt driven cone operates the other cone by means of a pair of balls of friction material held in contact with each other and with the respective cones by a ball cage having rotatable spools.

The position of the balls with respect to the cones, and hence the quantities as recorded by the other cone, is controlled by a pivotally mounted weight bar having a slidable weight thereon, whose position in turn is controlled by the described hydraulic pressure as transmitted to a bellows construction and thence to the weight bar. The position of the weight bar determines the on or off operation of ratchet means for moving the weight, and the ball cage as connected to the weight.

Accordingly, it is an object of the present invention to provide a weighing device for belt conveyor uses of all types.

Another object of the invention is to provide a compact, lightweight, hydraulic-mechanically operated weighing and recording machine which does not interfere with the use of the belt.

Another object of the invention is to provide a device as described which can be effectively operated by non-technical personnel and gives an accurate, readily accessible indication of weights in an automatic manner which eliminates manual computation and provides reliable data on delivered tonnages without restriction or interference with the flow of material to the job site or point of use.

Another object of the invention is to provide a device as described which requires no special engineering accessories or outside power to place it into operation.

Another object of the invention is to provide a device as described which has a wide range of use, both with respect to materials which can be weighed and the weight range thereof; which is not susceptible to vibration, and is sufficiently light as to be practical for use in portable as well as stationary equipment.

Another object of the invention is to provide a device which is highly sensitive and accurate, but sufficiently rugged to withstand the conditions encountered on construction jobs.

Another object of the invention is to provide a device which requires no electrical connections for its operation and which relies solely upon its mechanical and hydraulic mechanisms, although being adapted for electronic use with distance reading devices as required.

Another object of the invention is to provide a device which records only delivered weight so that all variations in the weight of the transporting or shipping media are of no effect in respect to the accuracy of the recorded, actual delivered weight.

Another object of the invention is to provide a device which is fully dependable and affords trouble-free operation, and wherein belt speed, belt size and the weight carried on the belt do not impose limitations in use.

Another object of the invention is to provide a device which is adaptable for automatic control of the weight of materials delivered by belt delivery systems, since materials in specified weights or amounts may be delivered by automatic push button control on a pre-set weight basis.

Other objects and advantages of the invention will become apparent as the description proceeds in accordance with the drawings in which:

FIGURE 3 is an enlarged front view, partly broken away, of the weighing device of the invention;

FIGURE 4 is a schematic, fragmentary view of means for relating the hydraulic and mechanical portions of the invention;

FIGURE 5 is a front elevational view showing the recording device within the cabinet and as mounted on the conveyor belt frame, And FIGURE 6 is an indicator bar according to the invention.

Figure 1:
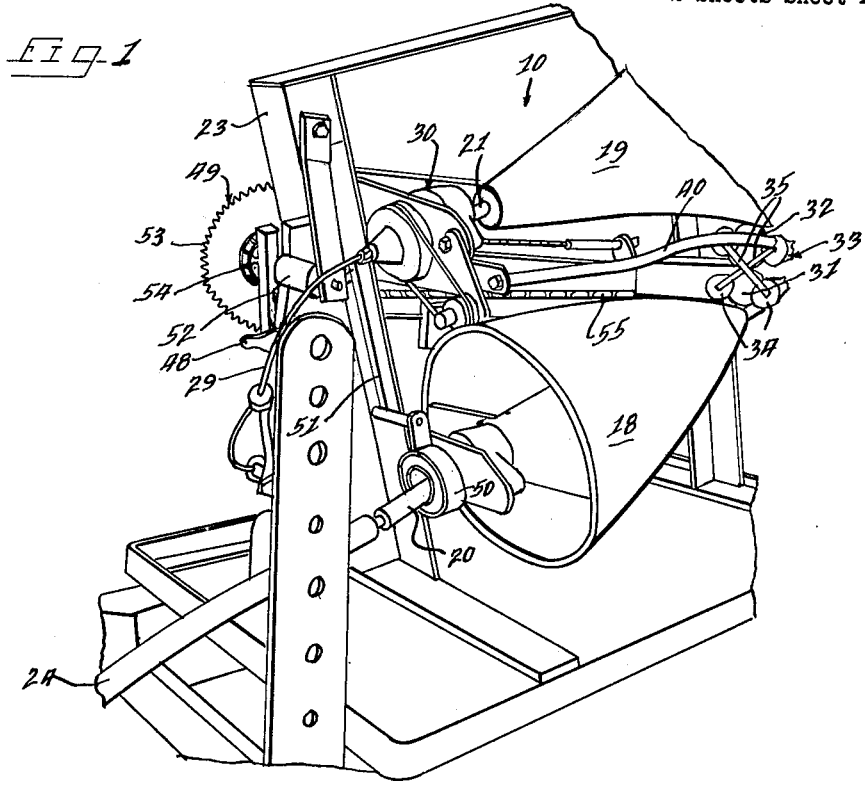
FIGURE 1 is an enlarged fragmentary rear perspective view of a recording mechanism according to the present invention.
Figure 2:
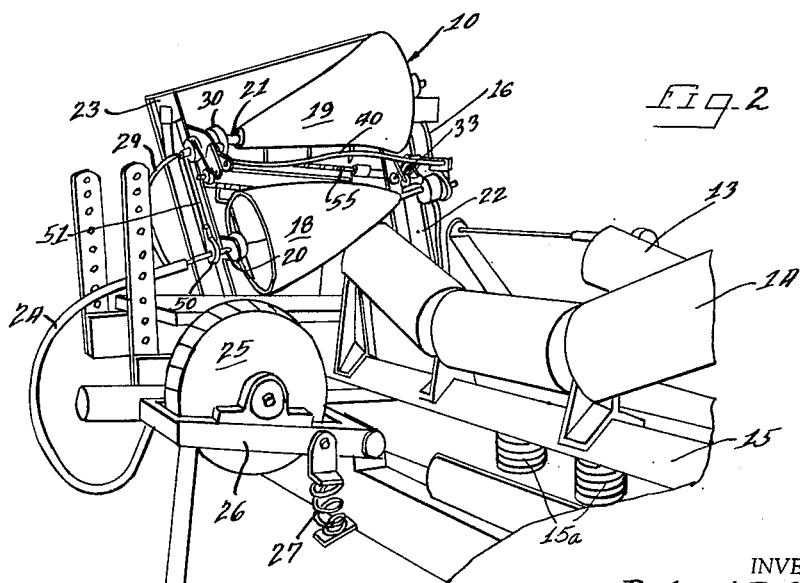
FIGURE 2 is a similar view showing a portion of the belt supporting mechanism constituting a sub-frame associated with hydraulic means according to the invention, as well as scale driving means.

Referring now to the drawings, a weighing and recording device 10 is shown according to the present invention for weighing materials on a conveyor belt 11. Such materials, for example, may include highway servicing materials and aggregates, mining, milling and smelting materials, materials for mobile-type construction installations, manufacturing materials and supplies, grain and seed for milling and storage, and materials for transport by ship, truck, rail or air in controlled weights, and, in fact, materials for all conveyor belt uses.

The belt 11 is supported on a frame 12 or the like of the usual type, and is conventionally driven by roller means or the like (not shown). The belt is further supported on rollers journalled along the frame 12; and, in accordance with the invention, a pair of rollers 13 and 14 is mounted on a sub-frame assembly 15 which in turn is mounted on a hydraulic bellows or pressure chamber having a diaphragm or the like, as at 15a for controlling hydraulic pressure in a conduit 16. The tube 16 in turn communicates with a small hydraulic bellows 17 as hereinafter described.

In order to translate the pressures transmitted by the hydraulic means, and corresponding to weights on the belt 11, the recording mechanism includes a pair of modified cones 18 and 19 mounted on shafts 20 and 21 respectively, which extend through the cone axes and are supported on bearings mounted on the upstanding supports 22 and 23. The axes of the shafts 20 and 21 are substantially parallel, and the cones are axially reversed and preferably substantially congruent as hereinafter described, whereby the immediately opposed adjacent cone surfaces extend in substantially parallel relationship.

The lower cone 18 is a drive cone and is connected by a flexible shaft 24 to a drum 25 journaled in a bracket structure 26 which is mounted resiliently by means of a spring 27 for driving relation with the lower reach of the belt 11. Desirably, therefore, the lower drive cone 18 is rotated one revolution for each unit of belt travel, as may be determined in terms of the particular recording use.

The upper cone 19 is connected to a counter 28 by way of suitable flexible drive and reduction means 29 and 30 associated with the shaft 21 thereof.

In order to drive the cone 19 in a proportionate relation to the rate of the rotation of the cone 18, as determined by the weight of the belt, intermediate drive means are provided which, in the present form of the invention, constitute a pair of friction balls 31 and 32. The balls 31 and 32 are held in contact with each other and with their respective cones by means of a ball cage 33 which may include, for example, a plurality of paraboloid spools 34 journaled by suitably joined brackets 35 to align the spools in ball retaining position. Thereby, the torque of the lower cone 18 is effectively transmitted to the upper cone 19.

Further in accordance with the invention, and so as to dispose the balls 31 and 32 in axial relation to the cones 18 and 19 corresponding to a particular relative weight on the belt 11, the ball cage is connected to a weight 36 which is slidable on a weight bar 37, the balls themselves being moved with chain 55 and being guided to move with said weight through the medium of a rod or the like 38 operatively associated with a resilient connection 39 for the ball cage. Thus the ball cage is enabled to ride along a guide rod 40 preferably shaped conformably to the outline of the flexible cones 18 and 19, as seen in FIGURE 1.

The weight bar 37 is thus maintained closely aligned with the guide rod 40 for the ball cage, and is pivotally mounted for control by the bellows means 17. Preferably, the pivots for supporting the weight bar 37 are close to the apex end of the lower cone 18 and constitute a point 41 and socket 42. A further weight or column counter-balance 43 may be mounted on the weight bar member 44.

The end of the weight bar 37 which is next to the base of the lower cone is retained by a stop 45 which permits it to move pivotally up and down by a predetermined limited amount. In order to actuate the weight 36, the end of the weight bar is flexibly connected (i.e. by suitable journal means 46) to a member 47 which controls the action of a ratchet or rocker arm 48, as hereinafter set forth. The rocker arm 48 intermittently operates a double ratchet wheel 49 when the weight arm or bar 37 is in an upper or lower position. The rocker arm 48 is energized so as to intermittently actuate and rotate the double ratchet wheel 49, through the rotating shaft 20 of the lower cone. For this purpose, the rotating shaft 20 carries an eccentric element in a bearing 50 connected to a shaft 51, which in turn is connected to a rocker element 52 operably connected to the rocker arm 48. Thereby, when the bar 37 moves the rocker arm to ratchet energizing position, the rotation of the drive shaft 20 as energized by the shaft or flexible member 24, will rotate the large ratchet wheel 53 of the double ratchet wheel 49. The large ratchet wheel 53 in turn is connected to a small ratchet wheel or sprocket 54, on which is entrained a chain 55. The chain 55 is joined to the weight 36 through the means 38, or other structure associated therewith, so that movement of the chain will also move the weight 36.

When the weight carried by the conveyor belt 11 varies significantly a corresponding change is effected in the pressure of the previously described hydraulic system, which in turn causes the small bellows 17 to act upon the pivoted end of the weight bar and on the outer end portion of the bar adjacent the pivot point, as effected through a pressure bar or the like 56. Preferably, the scale is adjusted so that when the belt is running without load, the ball cage structure is positioned so that the revolving ball 32 is just out of contact with the upper cone, whereby the cone will not then be rotated and the weight recorder will be inoperative. As material carrying is initiated, hydraulic pressure will be exerted on the bellows 17 to raise weight bar 37 and the weight 36, thereby in turn actuating the double ratchet wheel 49 as described, so that the movable weight 36 is slid along the weight bar until its downward pull overcomes the downward pressure of the bellows at the opposite end of the fulcrum. At this time, the weight bar pivots clockwise or downwardly and remains in this position until a further change of weight and the material carried by the belt effects a further shifting of the weight 36 along the weight bar 37.

As stated, the cage which controls the position of the friction balls 31 and 32 is also linked to the weight 36 so that any change in the position of the weight along weight bar also results in a corresponding shift of the position of the cage along the guide rod 40. Thereby, a change of equivalent amount is effected in the point of contact of the balls 31 and 32 with the surfaces of the respective cones.

Thus, an increase in the weight of the material carried by the belt 11 will cause the ball cage to be shifted from the apex end of the lower cone toward the base of the lower cone, and vice versa with respect to the upper cone. Thereby, as will be seen, the rate of rotation of the upper cone 19 will be proportionate to the weight on the belt, and to the basic rate of rotation of the driving cone 18.

As will also be seen, the cones 18 and 19 are not geometrically true cones, but are in fact modified and contoured with a precise calibration such that a unit shift of the weight 36 and a consequent equivalent shift of the ball cage, is effective to cause a corresponding change in the rate of rotation of the upper cone 19, and by means of the connection of the cone 19 to the recorder to produce accurate recording of the variable weight of the material carried by the belt 11.

The reversely mounted cones 18 and 19 afford an extremely high ratio change, and since they are accurately proportioned and calibrated, the scale itself is thus enabled to record the weight of greatly varying loads throughout the entire range thereof and with an unusually high degree of accuracy which in practice is only a small fraction of one percent error.

Adjustments of the scale for any particular conveyor, in accordance with the invention, may be accomplished by means of test runs at the time of installation, as to which a periodic check of zeroing pointers when the belt is running may suffice to assure successful operation.

The invention provides for a pointer bar 58 having preferably three pointers 59, 60 and 61. The ball cage may engage the chain ends at a point such as indicated at 61, or in any suitable manner which will provide an indication base for the pointers 59, 60 and 61. The pointer 59 may correspond to a zeroing pointer, the pointer 60 to a high range setting and the pointer 61 to a low range setting. For example, if the peak load to be carried by the belt is less than 75 pounds per foot, the low range may be used, but if more than this amount, the high range would be used. However, it will be understood that the high range setting may be used for all these, although the low range setting affords optimum accuracy. The upper shaft 21 is set correspondingly with respect to the reduction means 30 so that, for the low range setting, the small flexible extension is connected to the cone shaft 21 and rotates as the cone 19 does.

For the high range setting, the small flexible shaft is connected to the driven element of the reduction or multiplier structure 30 so that it rotates at twice the rotation of the cone, in a suitable example. In cases where a narrow conveyor belt is used, and the maximum belt loading will be less than 50 pounds per foot and a light load is expected for a large percentage of the measuring time, it is desirable to reverse the mountings of the members of the multiplier or reducer 30 so that it becomes a reducer.

It will be further understood that the weight bar 37 may be adjusted by a balance means including a large scale balance 43 and a fine adjustment balance 63 disposed relative to a secondary weight bar portion 44. Thus, when the weight bar 37 is properly set, it will neutralize the action of the ratchet or rocker arm 48, when disposed in the center position, and will move the ball cage to the right when the said bar is in the upper position. Conversely, when the bar is in the lower position the ball cage is moved to the left, in the example shown. Suitable adustment means to assure this mode of operation are provided in the spring mounting for the ratchet or rocker arm 48.

Also, adustment in the reference point provided by the ball cage in respect to the pointers may be afforded by adjustment of the contact or pivot connection of the smaller bellows bar 56 with the weight bar 37, as by adjustment to move the point of contact toward or away from the fulcrum point of the weight bar so as to decrease or increase the downward push of the bellows and bar 56 on the left hand end of the weight bar. The adjustable pivot for the bar 56 is slidably mounted on the weight bar 37 for this purpose.

A calibrated bar 58a may desirably replace the bar 58 and with a pointer 64 carried by the chain structure 55 to indicate position of the ball cage.

As noted, when a remote counter or other electrical attachment is to be used with the scale, an auxiliary electrical system is required. For this purpose, a receptacle box may be provided under the cabinet with an electrical cord having a male plug to plug into an extension from the power source. The electrical circuit may be surge-connected to a make-and-break contact mechanism (not shown) which is actuated by the drive shaft 24. Thus the points will open and close once each revolution to cause the remote counter to record at the same rate as the revolution counter.

For regular totalizing recording, no outside source of power or connection to any other device is required, except the described connection with the belt 11. Although, for use with a remote counter, a connection to electrical power is necessary, as stated, the invention requires no electrical connections for its basic operation and relies solely upon mechanical and hydraulic principles which are built into the unit as an integral part of the functioning mechanism.

Accordingly, a hydraulic and mechanical weighing device has been provided which is compact, portable versatile and effective to weigh materials of all kinds under all circumstances. The device is extremely reliable and operable over long periods of time without breakdown; and is further effective for automatic control of materials in batches or otherwise as delivered, for example, by automatic pushbutton control on a pre-set basis. To this end, feedback means 57 may be utilized in conjunction with the recording means 28.

Although I have herein set forth and described my invention with respect to certain specific features and details thereof, it will be understood by those skilled in the art that these may be varied without departing from the spirit and scope of the invention as set forth in the hereunto appended claims.

I claim as my invention:

1. A mechanism for use in indicating weight on a conveyor belt or the like comprising:
   a pair of cones,
   means mounting the cones for rotation about substantially parallel axes,
   means for rotating one of the cones as a direct function of the rate of movement of a conveyor belt,
   means for transmitting rotation from said one cone to the other cone,
   hydraulic pressure means responsive to the weight on the conveyor belt,
   a weight bar,
   means for utilizing the rotation of the other cone as a weight indicator for weight on the conveyor belt,
   means for changing the position of the weight bar in accordance with pressure changes in the hydraulic pressure means,
   actuating means connected to the means for transmitting rotation including a ratchet wheel,
   a ratchet engaging the ratchet wheel in response to a changed position of the weight bar,
   means actuating the ratchet and means operated by the ratchet wheel and controlling the position of the means for transmitting the rotation from the one cone to the other cone.

2. The device according to claim 1 wherein said means actuated by the position of said weight bar including a ratchet wheel,
   a ratchet engaging the ratchet wheel in response to a changed position of the weight bar,
   chain and sprocket means connected to the ratchet wheel,
   means actuating the ratchet and chain and sprocket means operated by the ratchet wheel and controlling the position of the means for transmitting the rotation of the one cone to the other cone.

3. A belt conveyor scale and recorder comprising:
   a pair of modified cones being mounted for rotation about substantially parallel axes,
   said cones having contoured non-linear side surfaces and being axially reversed and congruent wherein the immediately opposed adjacent surfaces of the cones extend in a parallel relationship,
   rotation means connected to one cone and to a conveyor belt to rotate the one cone as a direct function of the rate of movement of the conveyor belt,
   counter means connected to the other cone and operated by the rotation thereof,
   cone rotation means being mounted adjacent the two cones and contacting the surfaces of both cones to rotate the other cone,
   a guide means being mounted adjacent said cones,
   said cone rotation means being axially guided by said guide means,
   weight means being in a normally neutral position,
   means connecting the weight means and the cone rotation means to axially move the cone rotation means along the surfaces of the cones when said weight means is moved out of its neutral position,
   means connected to the conveyor and to the weight means to move the weight means out of its neutral position in response to the weight on the conveyor,
   means connected to the weight means and one of the cones to return the weight means to its neutral position when it is moved out of its neutral position, and
   the shape of the cones surfaces being contoured such that the change in rate of rotation of the other cone with respect to the one cone is substantially a linear function of the axial position of said cone rotating means, whereby movement of the weight means from its neutral position axially moves the cone rotation means and then returns the weight means to its neutral position to provide an accurate recording means.

4. A conveyor scale and recorder comprising:
a pair of modified cones being mounted for rotation about substantially parallel axes,
said cones having contoured non-linear side surfaces and being axially reversed and congruent wherein the immediately opposed adjacent surfaces of the cones extend in a parallel relationship,
rotation means connected to one cone and to a conveyor to rotate the one cone as a direct function of the rate of movement of the conveyor,
counter means connected to the other cone and operated by the rotation thereof,
cone rotation means being mounted adjacent the two cones and engaging the surface of the one cone and being spaced from the surface of the other cone when there is no weight on the conveyor,
a guide means mounted adjacent said cones,
said cone rotation means being axially guided by said guide means,
weight means being in a normally neutral position,
means connecting the weight means and the cone rotation means,
with the cone rotation means being guided to move with said weight means and have said cone rotation means contact both cones to rotate the cones,
a ratchet,
means connecting the weight means to said ratchet to energize said ratchet when the weight means is moved out of neutral position,
a ratchet wheel,
said ratchet being positioned adjacent to said ratchet wheel to intermittently actuate and rotate said ratchet wheel through the rotating one cone when said ratchet is energized,
means connected to said ratchet wheel and said weight means to move said weight means with the rotation of said ratchet wheel,
means connected to the weight means and the conveyor to sense the weight of material on the conveyor and to move the weight means out of neutral position in accordance to the weight on the conveyor,
means connected to the weight means to return the weight to its neutral position when it is moved out of its neutral position, and
the shape of the cones surfaces being contoured such that the change in rate of rotation of the other cone with respect to the one cone is substantially a linear function of the axial position of said cone rotating means whereby the movement of the weight means from its neutral position actuates the ratchet to rotate the ratchet wheel to move the weight means and axially move the cone rotation means to return the weight means to its neutral position and disengage the ratchet to stop rotation of the ratchet wheel and to thereby provide an accurate recording means.

5. A conveyor scale and recorder comprising:
a pair of modified cones being mounted for rotation about substantially parallel axes,
said cones having contoured non-linear side surfaces and being axially reversed and congruent wherein the immediately opposed adjacent surfaces of the cones extend in a parallel relationship,
rotation means connected to one cone and to a conveyor to rotate the one cone as a direct function of the rate of movement of the conveyor,
counter means connected to the other cone and operated by the rotation thereof,
friction means,
said friction means being mounted adjacent the two cones and engaging the surface of the one cone and being spaced from the surface of the other cone when there is no weight on the conveyor belt,
a guide rod mounted adjacent said cones,
said friction means being slidably mounted on said guide rod,
a movably mounted weight bar,
a weight slidably mounted on said weight bar,
means connecting the weight and the friction means to move with said weight and have said friction means contacting both cones to rotate the cones,
said weight bar being in a normally neutral position wherein the weight is stationary on the weight bar,
a ratchet,
means connecting the weight bar to said ratchet,
a ratchet wheel,
said ratchet being connected to said ratchet wheel to intermittently actuate and rotate said ratchet wheel through the rotating one cone when said ratchet is energized,
means connected to said ratchet wheel and said weight to move said weight along said weight bar with the rotation of said ratchet wheel,
moving means connected to the weight bar to move said weight bar,
means connected to the moving means and the conveyor to sense the weight of material on the conveyor and to actuate the moving means to move the weight bar in accordance to the weight on the conveyor,
said weight bar having the weight mounted thereon to move in a direction to return the weight bar to its neutral position when the moving means moves it out of its neutral position, and
the shape of the cones surfaces being contoured such that the change in rate of rotation of the other cone with respect to the one cone is substantially a linear function of the axial position of said friction means whereby pivoting of the weight bar from its neutral position actuates the ratchet to rotate the ratchet wheel to axially move the weight and the friction means to return the weight bar to its neutral position and disengage the ratchet to stop rotation of the ratchet wheel and to thereby provide an accurate recording means.

6. A conveyor scale and recorder comprising:
a pair of modified cones being mounted for rotation about substantially parallel axes,
said cones having contoured non-linear side surfaces and being axially reversed and congruent wherein the immediately opposed adjacent surfaces of the cones extend in a parallel relationship,
rotation means connected to one cone and to a conveyor to rotate the one cone as a direct function of the rate of movement of the conveyor,
counter means connected to the other cone and operated by the rotation thereof,
a pair of friction means,
said friction means being in contact with each other,
said friction means being mounted adjacent the two cones with one in contact with one cone surface and the other being spaced from the surface of the other cone when there is no weight on the conveyor belt,
an axially extending guide rod shaped and conformably to the outline of the cones and being mounted adjacent said cones,
said friction means being slidably mounted on said guide rod,
a pivotally mounted weight bar,
a weight slidably mounted on said weight bar,
a bar means connecting the weight and the friction means with the friction means being guided to move with said weight and have both friction means contacting both cones to rotate the cones,
said weight bar being in a normally neutral position wherein the weight is not moved along the weight bar,
a ratchet,
means connecting the weight bar to said ratchet,
a ratchet wheel,
said ratchet being positioned adjacent to said ratchet wheel to intermittently actuate and rotate said ratchet wheel through the rotating one cone when said ratchet is energized,
means connected to said ratchet wheel and said weight to move said weight along said weight bar with the rotation of said ratchet wheel,
pivoting means connected to the weight bar to pivot said weight bar,
means connected to the pivoting means and the conveyor to sense the weight of material on the conveyor and to actuate the pivoting means to pivot the weight bar in accordance to the weight on the conveyor,
said weight bar having the weight mounted thereon to move in a direction to return the weight bar to its neutral position when the pivoting means pivots the bar out of its neutral position, and
the shape of the cones surfaces being contoured such that the change in rate of rotation of the other cone with respect to the one cone is substantially a linear function of the axial position of said friction means whereby pivoting of the weight bar from its neutral position actuates the ratchet to rotate the ratchet wheel to axially move the weight and the friction means to return the weight bar to its neutral position and disengage the ratchet to stop rotation of the ratchet wheel and to thereby provide an accurate recording means.

7. A belt conveyor scale and recorder comprising:
a pair of modified cones being mounted for rotation about substantially parallel axes,
said cones having contoured non-linear side surfaces and being axially reversed and congruent wherein the immediately opposed adjacent surfaces of the cones extend in a parallel relationship,
rotation means connected to one cone and to a conveyor belt to rotate the one cone as a direct function of the rate of movement of the conveyor belt,
counter means connected to the other cone and operated by the rotation thereof,
a pair of friction balls,
a ball cage holding said friction balls in contact with each other,
said friction balls being mounted adjacent the two cones with one ball in contact with one cone surface and the other ball being spaced from the surface of the other cone when there is no material to be weighed on the conveyor belt,
an axially extending guide rod shaped and conformably to the outline of the cones and being mounted adjacent said cones,
said ball cage being slidably mounted on said guide rod,
a weight bar pivotally mounted at one end thereof,
a weight slidably mounted on said weight bar,
a rod means connecting the weight and the ball cage with the cage being guided to move with said weight and have said other ball contact the other cone to rotate the other cone,
a stop means mounted adjacent the other end of the weight bar to permit the bar to move up and down a predetermined amount,
said weight bar being in a normally neutral posititon,
a ratchet,
means connecting the one end of the weight bar to said ratchet,
a double ratchet wheel having a large and small ratchet wheel,
said ratchet being positioned adjacent to said ratchet wheel to intermittently actuate and rotate said ratchet wheel through the rotating one cone when said ratchet is energized,
a chain connected to said small ratchet wheel and said weight to move said weight along said weight bar with the rotation of said small ratchet wheel,
pivoting means connected to the other end of the weight bar to pivot said weight bar,
hydraulic pressure means connected to the pivoting means and the conveyor to sense the weight of material on the conveyor and to actuate the pivoting means to pivot the weight bar in accordance to the weight on the conveyor,
said weight bar having the weight mounted thereon to move in a direction to return the weight bar to its neutral position when the pivoting means moves it out of its neutral position, and
the shape of the cones surfaces being contoured such that the change in rate of rotation of the other cone with respect to the one cone is substantially a linear function of the axial position of said friction means whereby pivoting of the weight bar from its neutral position actuates the ratchet to rotate the double ratchet wheel to axially move the weight and the balls to return the weight bar to its neutral position and disengage the ratchet to stop rotation of the ratchet wheel and to thereby provide an accurate recording means.

8. A belt conveyor scale comprising:
a pair of modified cones being mounted for rotation about substantially parallel axes,
said cones having contoured non-linear side surfaces and being axially reversed and congruent wherein the immediately opposed adjacent surfaces of the cones extend in a parallel relationship,
rotation means connected to one cone and to a conveyor belt to rotate the one cone as a direct function of the rate of movement of the conveyor belt,
cone rotation means being mounted adjacent the two cones and contacting the surfaces of both cones to rotate the other cone,
weight means being in a normally neutral position,
means connecting the weight means and the cone rotation means to move the cone rotation means along the surfaces of the cones when said weight means is moved out of its neutral position,
means connected to the conveyor and to the weight means to move the weight means out of its neutral position in response to the weight on the conveyor,
means connected to the weight means and one of the cones to return the weight means to its neutral position when it is moved out of its neutral position, and
the shape of the cones surfaces being contoured such that the change in rate of rotation of the other cone with respect to the one cone is substantially a function of the position of said cone rotating means, whereby movement of the weight means from its neutral position axially moves the cone rotation means and then returns the weight means to its neutral position.

9. A belt conveyor scale comprising:
a pair of modified cones being mounted for rotation about substantially parallel axes,
said cones having contoured non-linear side surfaces and being axially reversed and congruent wherein the immediately opposed adjacent surfaces of the cones extend in a parallel relationship,
rotation means connected to one cone and to a conveyor belt to rotate the one cone as a direct function of the rate of movement of the conveyor belt,
cone rotation means being mounted adjacent the two cones and contacting the surfaces of both cones to rotate the other cone,
weight means being in a normally neutral position,
means connecting the weight means and the cone rotation means to axially move the cone rotation means along the surfaces of the cones when said weight means is moved out of its neutral position, means connected to the conveyor and to the weight means to move the weight means out of its neutral position in response to the weight on the conveyor, means connected to the weight means and one of the cones to return the weight means to its neutral position when it is moved out of its neutral position, and the shape of the cones surfaces being contoured such that the change in rate of rotation of the other cone with respect to the one cone is substantially a linear function of the axial position of said cone rotation means, whereby movement of the weight means from its neutral position axially moves the cone rotation means and then returns the weight means to its neutral position.

References Cited in the file of this patent

UNITED STATES PATENTS

| | | |
|---|---|---|
| 777,663 | Christie | Dec. 20, 1904 |
| 998,974 | Messiter | July 25, 1911 |
| 1,032,183 | Buchan | July 9, 1912 |
| 1,074,123 | Kinne | Sept. 30, 1913 |
| 1,237,332 | Hebden | Aug. 21, 1917 |
| 1,435,250 | Moakley | Nov. 14, 1922 |
| 1,875,485 | Okada | Sept. 6, 1932 |
| 2,228,068 | White | Jan. 7, 1941 |
| 2,365,937 | Christman | Dec. 26, 1944 |
| 2,394,593 | Christman | Feb. 12, 1946 |
| 2,533,710 | Bieler | Dec. 12, 1950 |
| 2,583,790 | Mikina | Jan. 29, 1952 |
| 2,664,286 | Frazel | Dec. 29, 1953 |
| 2,918,269 | Williams | Dec. 22, 1959 |
| 2,927,785 | Lyons | Mar. 8, 1960 |

FOREIGN PATENTS

| | | |
|---|---|---|
| 545,811 | Belgium | Mar. 31, 1956 |
| 631,552 | Canada | Nov. 21, 1961 |
| 854,998 | Great Britain | Nov. 23, 1960 |